US 8,256,355 B2

(12) United States Patent
Dial et al.

(10) Patent No.: US 8,256,355 B2
(45) Date of Patent: Sep. 4, 2012

(54) COVER SYSTEM FOR OPEN TOP RAIL CARS

(75) Inventors: Darrell D. Dial, Fort Worth, TX (US);
Russell Dial, Fort Worth, TX (US);
Jason Dial, Westworth Village, TX (US);
Timothy P. Stanley, Fort Myers, FL (US)

(73) Assignee: Coalcap, LLC, Fort Worth, TX (US)

( * ) Notice: Subject to any disclaimer, the term of this patent is extended or adjusted under 35 U.S.C. 154(b) by 0 days.

(21) Appl. No.: 13/153,828

(22) Filed: Jun. 6, 2011

(65) Prior Publication Data

US 2012/0048140 A1    Mar. 1, 2012

Related U.S. Application Data

(60) Provisional application No. 61/440,017, filed on Feb. 7, 2011.

(51) Int. Cl.
*B61D 39/00* (2006.01)
*B61D 9/12* (2006.01)

(52) U.S. Cl. ................................... 105/377.05; 105/264

(58) Field of Classification Search ............ 105/377.01, 105/377.04, 377.05, 377.06, 377.07, 377.09, 105/239, 261.1, 264, 270; 296/100.01–100.09
See application file for complete search history.

(56) References Cited

U.S. PATENT DOCUMENTS

| 267,356 A | 11/1882 | Maxfield |
| 335,718 A * | 2/1886 | Price ....................... 105/377.05 |
| 805,999 A | 11/1905 | Reid et al. |
| 1,098,329 A | 5/1914 | Mead |
| 1,196,485 A | 8/1916 | Schubert |
| 1,210,556 A * | 1/1917 | Spratlen .................... 105/377.05 |
| 1,298,220 A * | 3/1919 | Jordan ............................ 16/371 |
| 1,357,119 A | 10/1920 | Royster |
| 1,598,471 A | 8/1926 | Williams |
| 2,123,838 A | 7/1938 | Baade |
| 2,218,561 A | 10/1940 | Strobell |
| 2,255,494 A | 9/1941 | Rhodes |
| 2,496,189 A | 1/1950 | Williams |
| 3,461,818 A * | 8/1969 | Sanders et al. ........... 105/377.05 |
| 3,628,828 A * | 12/1971 | Page et al. ....................... 49/381 |

(Continued)

FOREIGN PATENT DOCUMENTS

EP       0955196 A1    10/1999

*Primary Examiner* — S Joseph Morano
*Assistant Examiner* — Zachary Kuhfuss
(74) *Attorney, Agent, or Firm* — Charles D. Gunter, Jr.

(57) ABSTRACT

An improved rail car is pulled by an engine for transporting coal or other porous dust bearing materials. The car has opposing long sidewalls and opposing shorter end walls, which together define an initially open interior, a bottom and an open top. The open top of the car is covered by at least one pair of main doors in the form of opposing hinged A-frame sections which are pivotable between a closed, transport position and an open loading position which exposes the rail car interior for loading. The A-frame sections also have longitudinally spaced edges which are spaced apart to form a discharge door opening. A discharge door is located in each of the discharge door opening and is pivotally hinged within the respective door opening so that it opens under the influence of gravity in a rotary dumping operation. The discharge doors, together with the A-frame sections, form a door-within-a-door operating configuration.

17 Claims, 8 Drawing Sheets

U.S. PATENT DOCUMENTS

| | | | |
|---|---|---|---|
| 3,631,816 A * | 1/1972 | Miller .................... 105/377.05 | |
| 4,324,524 A | 4/1982 | Burston et al. | |
| 4,368,674 A | 1/1983 | Wiens et al. | |
| 4,569,289 A | 2/1986 | Gielow et al. | |
| 4,625,654 A | 12/1986 | Kuss et al. | |
| 4,942,911 A | 7/1990 | Herbet | |
| 5,152,575 A | 10/1992 | DeMonte et al. | |
| 5,544,686 A | 8/1996 | Kearney | |
| 5,893,399 A | 4/1999 | Kearney | |
| 6,250,233 B1 | 6/2001 | Luckring | |
| 6,976,433 B1 | 12/2005 | Neumann | |
| 7,083,375 B2 | 8/2006 | Lewis et al. | |
| 7,594,474 B2 | 9/2009 | Zupancich | |
| 7,823,515 B2 | 11/2010 | Schaefer et al. | |
| 7,878,124 B2 | 2/2011 | Low et al. | |
| 2011/0030575 A1 | 2/2011 | Schaefer et al. | |

* cited by examiner

COVER SYSTEM FOR OPEN TOP RAIL CARS

CROSS REFERENCE TO RELATED APPLICATIONS

The present application claims priority from a previously filed provisional application, Ser. No. 61/440,017, tiled Feb. 7, 2011, entitled "Cover System For Open Top Rail Car."

BACKGROUND OF THE INVENTION

1. Field of the Invention

The present invention relates generally to devices and methods for covering open top rail cars and, more specifically, to such devices and methods for covering open top coal cars transporting coal.

2. Description of the Prior Art

There are a number of rail lines in use at the present time in the United States for conveying coal from mines to other locations of use, such as a power plant. The accumulation of ballast/coal dust mixtures along the tracks can cause the installation to retain water, lose compressive strength and ultimately cause track surface irregularities. These problems are in addition to the obvious environmental impact.

There are presently three basic types of coal cars in use in the United States. They are all "open top" cars. The first of these is the bottom dump hopper car. Early bottom dump railcars utilized manual discharge gates which had to be opened and closed individually by hand. This made unloading slow and expensive. However, beginning in the late 1970s, fully automated bottom dump cars came into widespread use. Fully automated bottom dumpers use onboard compressed air to pneumatically open and close the discharge gates upon receipt of an appropriate electrical signal. This allows bottom dump trains to unload while moving.

The second type car in frequent use is the rotary dump gondola. The development of the high capacity rotary dump gondola in the early 1970s led to huge efficiency gains in coal transportation compared to traditional manually-operated bottom-dump hopper cars. Rotary dump cars are less expensive to manufacture and maintain since they have no moving parts other than the wheelsets, couplers, and brake rigging. They are generally lighter than bottom dump hoppers, which means increased coal capacity.

The most versatile coal cars in operation are the third type of cars known as combination hoppers, or simply as "combo-cars." They can be used in bottom dump or rotary dump operations. This style of cars is popular with large utilities who pool cars between multiple power plants thus requiring the car fleet to be capable of either bottom dump or rotary dump operation.

No matter which of the three basic car types is utilized, the open top of the car allows a certain amount of coal dust to blow out on the trip from the mine to the power plant or other distant location. Because a number of operational and environmental problems are associated with this unwanted discharge, various types of coal car "covers" have been proposed. The following patents are illustrative of the general state of the prior art.

U.S. Pat. No. 7,823,515, issued Nov. 2, 2010, to Schaefer et al., shows a rail car cover system including a rail car, a first cover section and a second cover section. The first cover section includes a first hinge mechanism and a first cover material. The second cover section includes a second hinge mechanism and a second cover material. The first cover section and the second cover section are both movable between a closed configuration and an open configuration. When in the closed configuration, the first cover section and the second cover section substantially cover the opening in the top of the rail car.

U.S. Pat. No. 7,594,474, issued Sep. 29, 2009, to Zupancich, shows an open-top rail car cover which is defined by a frame having dimensions sufficient to fit an open-top freight car. A latch disposed about a side of the frame includes a first flange and a second flange that combine to define a means for receiving an engagement member of a rail car. Both the first and second flanges include at least one first aperture and at least one second aperture designed to receive a means for securing the car cover to the rail car. The first and second apertures have dimensions sufficient to permit movement of the first and second flanges.

U.S. Pat. No. 7,083,375, issued Aug. 1, 2006, to Lewis et al., describes a system and method for handling and transporting moist bulk grain by-products by means of a rail car having an aluminum car body carried by a plurality of trucks for engaging rails. A flexible top cover, supported by a plurality of breakaway curved ribs, is positioned over an open top of the rail car to protect the moist bulk grain by-products carried therein. The car body has a front end and a rear end each having a wind screen for spoiling or deflecting the flow of air over the car as it moves to prevent the flexible top cover from being lost or damaged.

U.S. Pat. No. 6,250,233, issued Jun. 26, 2001, to Luckring, shows an extendable and retractable cover for use on gondola railroad cars, preferably provided as a kit for retrofitting existing cars. The kit includes a series of elongated runners for attaching to the top of longitudinal walls of the gondola railroad cars, the runners including at least one slidable surface, for supporting and permitting transport over the surface of a plurality of tarp supports, which extend across the lateral opening between the sidewalls of the gondola railroad car. The supports are configured to slide over the runners while enclosing an edge of the runner so as to engage the runner and retain the vertical position and orientation of the supports during transposition across the surface of the runners. The tarp support members support a flexible sheet tarpaulin, impermeable to rain and the elements, above the tarp supports.

U.S. Pat. No. 4,368,674, issued Jan. 18, 1983, to Wiens et al., describes a hatch cover for railroad hopper cars and a method of constructing same. The hatch cover includes a main panel and a stepped periphery, both of which are constructed of polyester resin impregnated with glass fiber reinforcement. Stiffening ribs on the panel include a honeycomb core enclosed by a rigid shell formed by glass fiber reinforced resin. The entire periphery of the panel is strengthened by thickening it, and the areas to which the hinges are attached is thickened additionally.

Despite the advances which have been made in the rail car arts, such as that described in the representative patents discussed above, there continues to exist a need for further improvements in the area of covers for open top rail cars.

There continues to exist a particular need for an improved cover for an open top coal car which will act to prevent coal dust from blowing out on the trip from the coal mine to the power plant or other ultimate destination.

A need also exists for such a cover which would also act to improve fuel efficiency of the rail car as a consequence of closing the open top of the cars, thereby improving the aerodynamic characteristics of the rail car.

A need also exists for such a cover which would act to prevent the ingress of rain, snow or other precipitates into the open car interior and onto any porous material contained therein, or into an empty car.

A need exists for a universal cover which will fit all common types of rail cars, which is relatively economical to implement without requiring extensive modification of the basic rail car design.

SUMMARY OF THE INVENTION

In combination, an improved rail car pulled by an engine for transporting coal or other porous dust bearing materials having opposing long sidewalls and opposing shorter end walls, which together define an initially open interior, a bottom and an open top and an improved cover for the open top of the car. The improved cover includes at least one pair of opposing A-frame sections mounted over the open top of the rail car. Preferably, there are three or more pairs of opposing A-frame sections mounted over the open car top. The A-frame sections can be moved between open and closed positions. Each of the A-frame sections has a first, longitudinal edge generally aligned with one of the opposing long sidewalls of the car in a closed position, the A-frame section also having a second, longitudinal edge spaced apart from the first longitudinal edge and opposing intermediate edges which, together with the longitudinal edges, form a discharge door opening for each of the A-frame sections.

At least one discharge door is located in the discharge door opening of at least selected ones of the A-frame sections. In some versions of the invention, there are two, or even more, discharge doors located in the discharge door openings. The discharge doors may be spring biased to the closed position in some instances. The discharge doors are pivotally hinged along a longitudinal axis which is generally parallel to the first and second longitudinal edges of the respective associated A-frame section.

An actuating mechanism is associated with each of the respective A-frame sections for moving each A-frame section from the closed position to an open, loading position to allow coal or other porous dust bearing material to be loaded into the open interior of the car. The actuating mechanism is then used to move the A-frame section to the closed position. Moving the A-frame sections from the open, loading position to the closed position protects the coal from air flow while in motion to a distant location and improves fuel economy of the engine by the reduction of aerodynamic drag. The discharge doors allow the coal or other porous material to be dumped in a rotary dumping operation.

The discharge doors are initially held in a closed position at least partly by the force of gravity when the respective A-frame sections are in the closed position. The discharge doors move under their own weight about their respective hinged longitudinal axis to open during a rotary dumping operation. The A-frame sections remain closed during the rotary dumping.

The A-frame sections in the closed position present an arcuate overall profile as viewed from the shorter end walls of the rail car. If the A-frame sections are thought of as the main doors for the rail car, then the discharge doors form a type of "door-within-a-door" configuration for the rail car.

It will be appreciated that the preferred cover design of the invention comprises a universal cover which will fit all three common types of "open top" rail cars in use at the present time in the industry.

In one preferred form of the invention, the intermediate edges of selected A-frame sections at an end of each rail car have arcuate end members located thereon. The end members, along with the A-frame sections, together define an end closure which helps to prevent porous material from being spilled while traveling and also reduces aerodynamic drag during transport operations.

The preferred actuating mechanism used to move the A-frame sections between the open and closed positions is a pivot-linkage mechanism. The preferred pivot-linkage mechanism which is associated with the A-frame sections includes a pivot link having an inner pivot end mounted on a structural member within the rail car open interior. The pivot link also has a second, outer pivot end which extends outwardly from the rail car open interior and which is attached at a pivot point located along the second longitudinal edge of the A-frame. Movement of the pivot link in an arcuate path of travel allows its associated A-frame section to slide over a respective longitudinal edge of the rail car as the A-frame section moves from the closed position to an open position, thereby covering a portion of a respective opposing long sidewall of the rail car. Movement of the pivot-linkage in the opposite direction causes the respective A-frame section to return to the closed position. When viewed from the end of the rail car, the pivot-linkage mechanism and its associated A-frame section present a sort of "hockey stick" profile.

The pivot link can be powered in any convenient way, such as by means of a pneumatic or hydraulic fluid cylinder having an output shaft which is associated with the pivot link.

At least selected ones of the discharge door openings may be at least partly covered with brushes which allow the rail car to be received in a rotary dumping apparatus. The presence of the brushes also serves to allow increased air flow into the car interior in the case of a bottom dumping operation.

A method is also shown for loading and unloading an open top rail car of the type previously described in a rotary dumping operation. A respective fluid cylinder is first actuated to move its associated A-frame section to the open position, thereby allowing the loading of coal into the rail car open interior. Thereafter, the fluid cylinder is again actuated to move the A-frame section to the closed, transport position. The closed rail car is then transported from a first location to a second, distant location, such as from a mine location to a power plant location.

At the unloading location, the rail car is moved into position within a rotary dumping apparatus. The dumping apparatus it then used to rotate the rail car in conventional fashion, whereby the rail car moves in an arcuate path of travel to a position in which the open interior of the car is oriented in an upside down position. This action causes the discharge doors to swing open by the influence gravity and of the porous material contained in the rail car interior to thereby dump the porous material. The procedure is then reversed to return the rail car to the upright position.

The cover of the invention can also be used in loading and unloading a bottom dump hopper style car, or with a "combo-car" due to its universal fit nature. In the case of the bottom dump car, it is not necessary to actuate the previously described pivot-linkage mechanism during the dumping operation. It is merely necessary to open the bottom dump doors on the car.

Additional objects, features and advantages will be apparent in the written description which follows.

DETAILED DESCRIPTION OF THE INVENTION

The embodiments herein and the various features and advantageous details thereof are explained more fully with reference to the non-limiting embodiments that are illustrated in the accompanying drawings and detailed in the following description. Descriptions of well-known components and processes and manufacturing techniques are omitted so as to not unnecessarily obscure the embodiments herein. The examples used herein are intended merely to facilitate an understanding of ways in which the invention herein may be practiced and to further enable those of skill in the art to practice the embodiments herein. Accordingly, the examples should not be construed as limiting the scope of the claimed invention.

Figure 1:
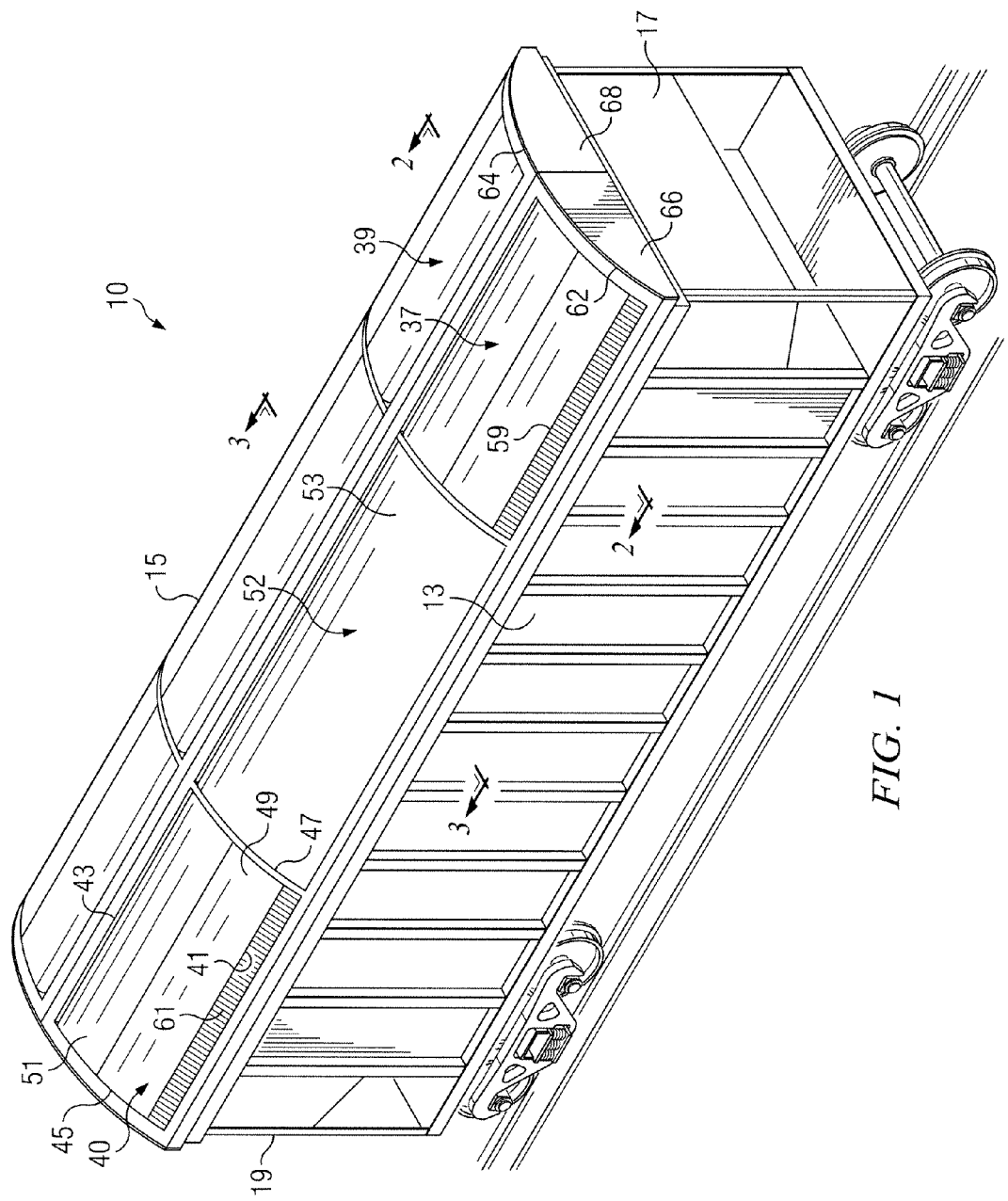
FIG. 1 is a perspective view of a rail car of the invention showing a cover of the invention with the cover A-frame sections in the closed or transport position.

With reference now to FIG. 1, there is shown a rail car 10 of the invention of the type which is pulled by a conventional locomotive engine (not shown). While the rail car 10 can be used to transport various types of porous materials, it is especially well suited for transporting coal, as from a mine location to a power generating plant or other distant location. The car has opposing long sidewalls 13, 15, and opposing shorter end walls, 17, 19. The opposing sidewalls all together define an initially open interior (generally at 21 in FIG. 2), a bottom 23, and an open top (generally at 25) for the car.

As discussed in the Background portion of the present description, the rail car 10, which is the subject of the improved cover of the invention, can be any of the basic car types presently available in the industry. Because of its "universal" nature, it can be used with bottom dump hoppers, with rotary dump gondolas, or with "combo-cars." As will be apparent from the discussion which follows, the cover of the invention is especially useful in the case of a "rotary dump" car. However, the present cover works equally well with a "bottom dump" or "combo-car."

A rotary car dumper apparatus will be familiar to those skilled in the industry. The apparatus is used for unloading the rotary dump gondola type car. It holds the rail car to a section of track and rotates the track and car together to dump out the contents. In the rotary dumping operation, the rail cars are equipped with rotary couplers. The dumper rotates the cars on the axis of the couplers.

There are advantages and disadvantages to the use of each of the rail car types. For example, rotary dumping eliminates the need for maintaining the additional components of a traditional hopper car, such as hopper doors and door locks. However, bottom dump cars are generally associated with faster train unloading times, although this time varies widely depending primarily on the ability of the system to remove product once dumped.

While the rotary dump apparatus does not form a part of the present invention, it will be apparent from the discussion which follows that the cover for a rail car of the invention works in cooperative fashion with the rotary dumper.

The improved universal cover for a rail car will now be described. A pair of opposing hinged A-frame sections (such as sections 37, 39 in FIG. 1) are mounted over the open top of the rail car 10. The pair of A-frame sections 37, 39 form a cooperating A-frame unit. While the number of opposing A-frame units may vary, depending upon the type of rail car and other factors, preferably two, or even three or more A-frame units are present. In the version of the cover of the invention shown in FIG. 1, there are three A-frame units.

Each of the A-frame sections (such as section 40 in FIG. 1) has a first, longitudinal edge (such as edge 41 in FIG. 1) generally aligned with one of the opposing long sidewalls 13 of the car in a closed position. The A-frame section 40 also has a second, longitudinal edge 43 spaced apart from the first longitudinal edge and opposing intermediate edges (45, 47). These various edges of the first A-frame section 40 define a discharge door opening for the A-frame section.

As can be seen in FIG. 1, at least one discharge door (such as door 49) is located in the discharge door opening of the A-frame section 40. In the example illustrated in FIG. 1, the A-frame section 40 also has a second door 51, while the A-frame section 52 located in the mid-region of the car 10 has only a singe discharge door 53. As can perhaps best be seen in FIG. 2, the discharge doors are pivotally hinged along a longitudinal axis (such as the axes 55, 57) which are generally parallel to the first and second longitudinal edges 41, 43 of the respective associated A-frame sections.

Note also that in the case of the A-frame sections 37 and 40 in FIG. 1, that a longitudinal strip of brushes 59, 61 fills a void area between the longitudinal edges 41 and the side of the rail car. These open areas allow the car to be gripped by the turning mechanism of the rotary dumper and may serve other purposes, as well. For example, during transport, the brushes help to reduce aerodynamic drag which would otherwise occur in the void areas and cover these areas as well, thereby cutting down on particulate emissions. In the case of the bottom dump car, the brushes allow venting of the car interior while dumping, helping to prevent any type of vacuum lock from occurring as the coal is being discharged. The bristles of the brushes are preferably formed of a conveniently available stiff synthetic polymer, plastic or polyolefin, for example Nylon™.

A sort of "hockey stick" pivot-linkage mechanism is associated with each of the respective A-frame sections for moving each A-frame section from the closed position to an open, loading position to allow coal or other porous dust bearing material to be loaded into the open interior of the car. Moving the A-frame sections from the open, loading position (shown in FIG. 4B) to the closed position (shown in FIG. 4C) protects the coal from air flow while in motion and improves fuel economy of the engine by the reduction of aerodynamic drag during transport. At the same time, the discharge doors allow the coal or other porous material to be dumped in a rotary dumping operation.

Figure 2:
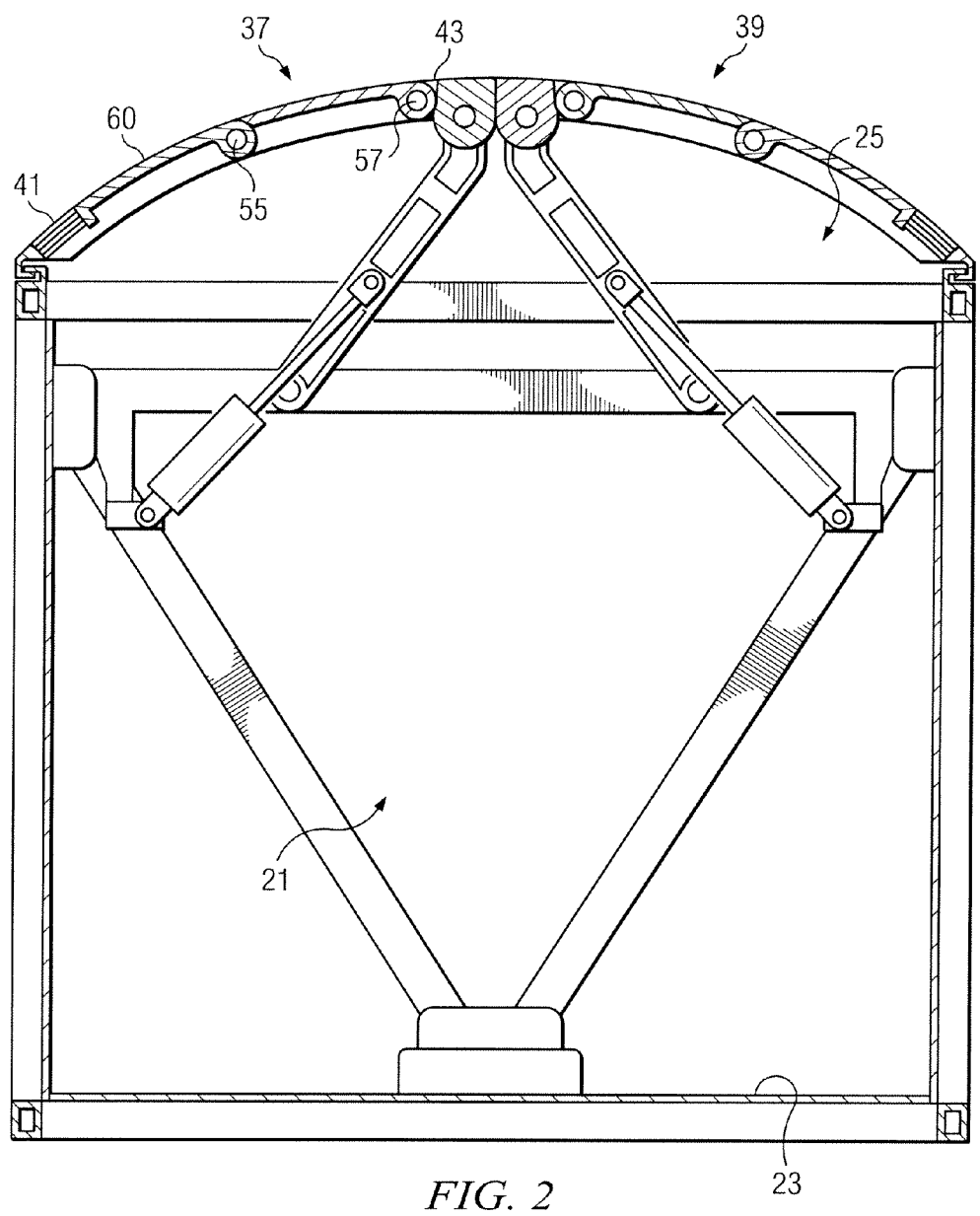
FIG. 2 is a partial sectional end view of the car of FIG. 1, taken along lines 2-2 in FIG. 1, showing the pivot mechanism which is used to open and close the A-frame sections and with the A-frame sections in the closed position.
Figure 4A:
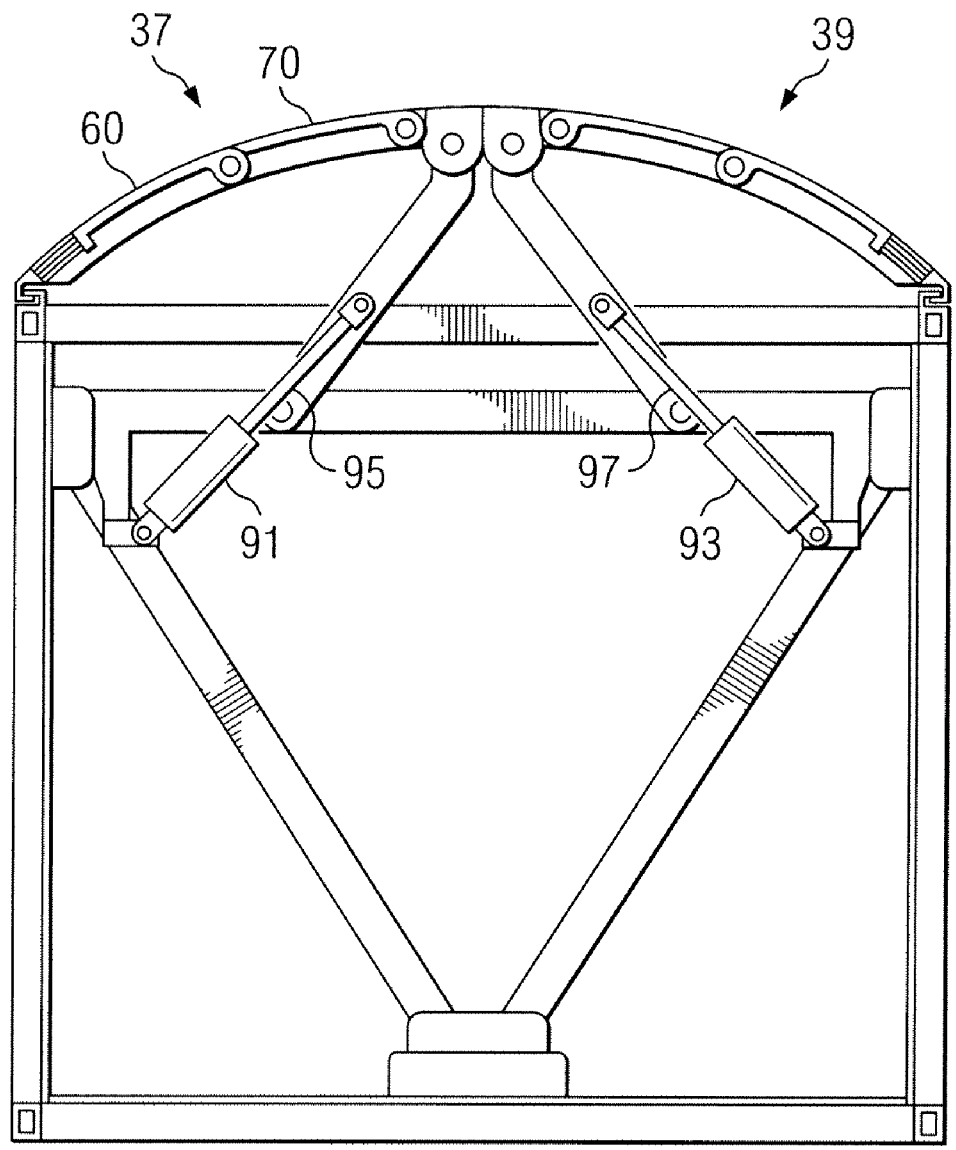
FIGS. 4A-4E are simplified, schematic views of the operation of the improved cover of the invention showing the steps from loading through the rotary dumping of the rail car in sequential order.
Figure 4B:
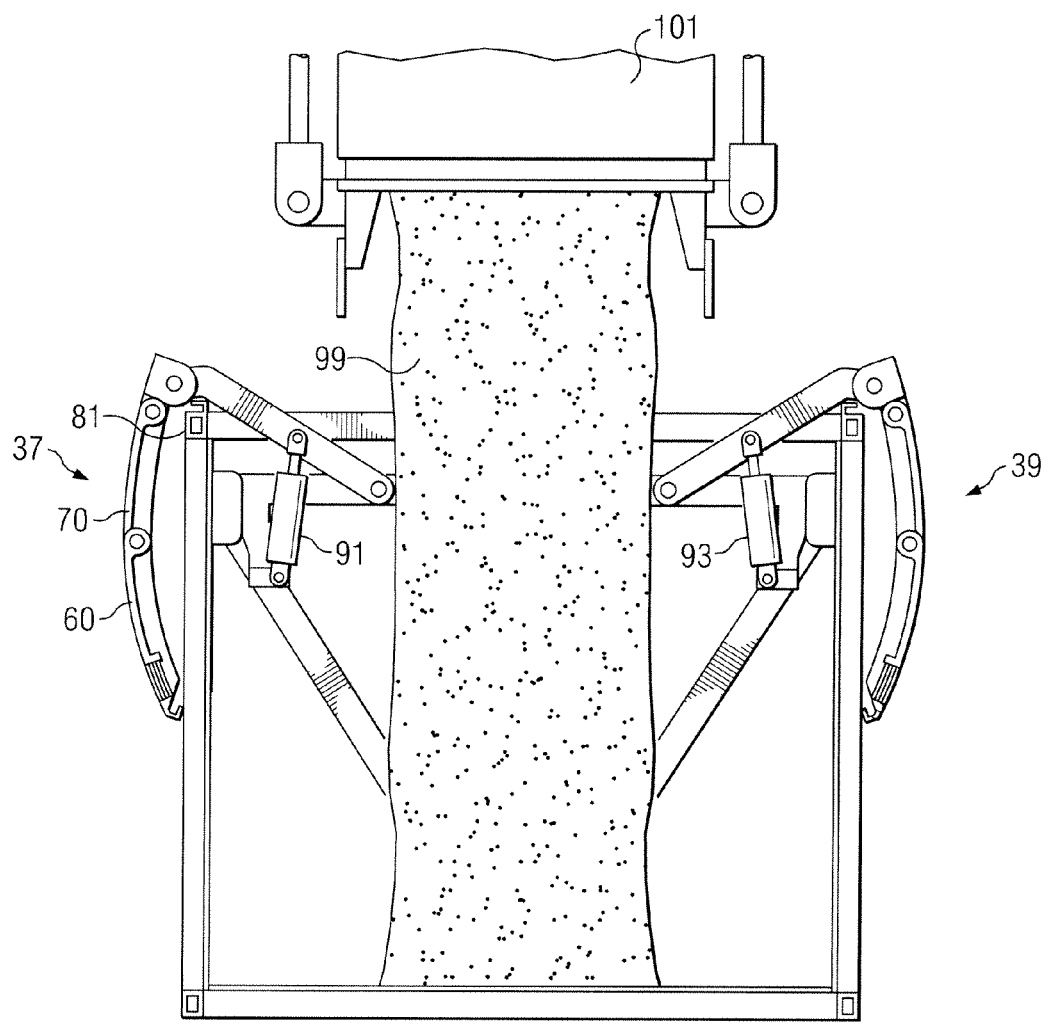
Figure 4C:
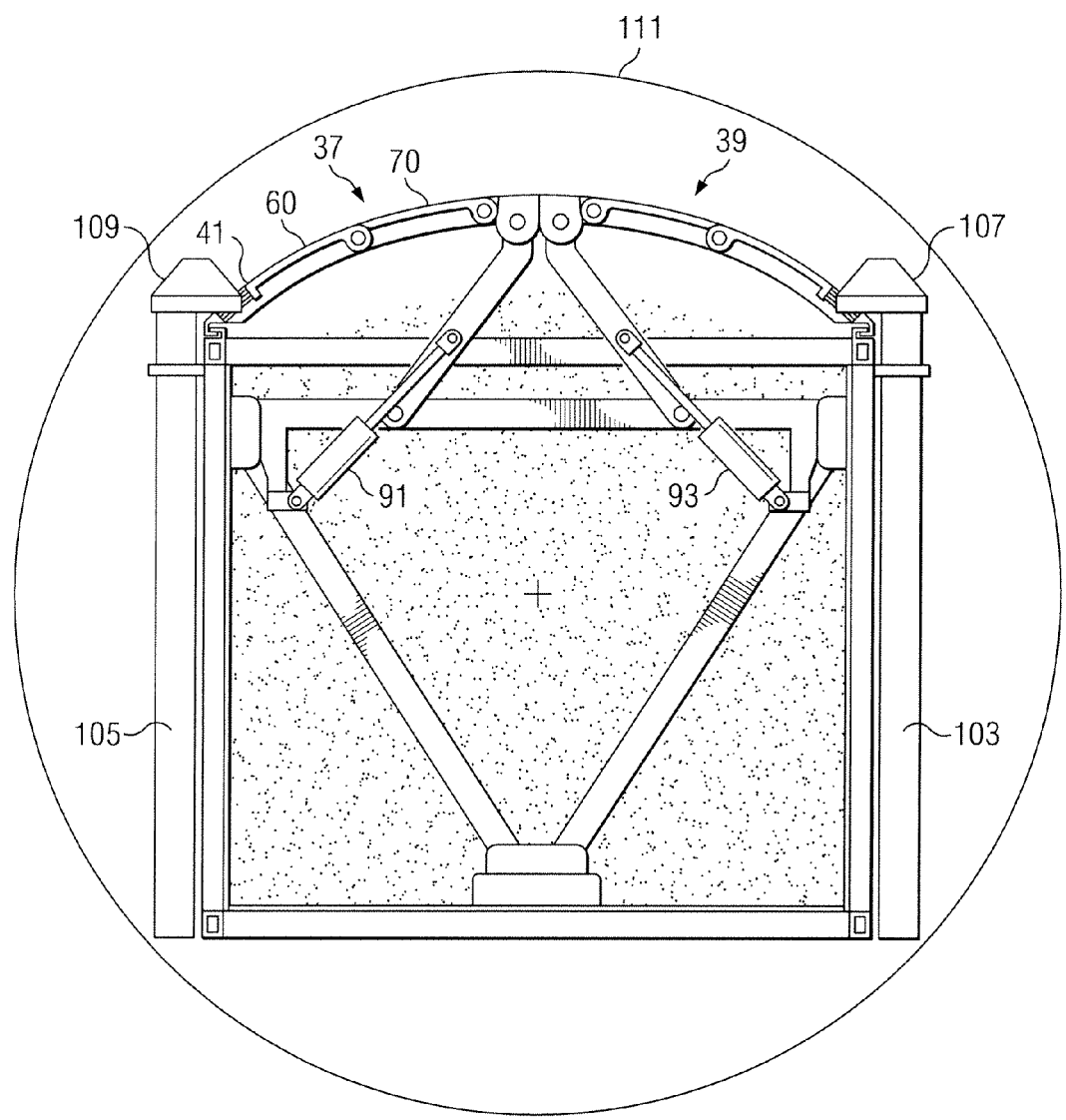
Figure 4D:
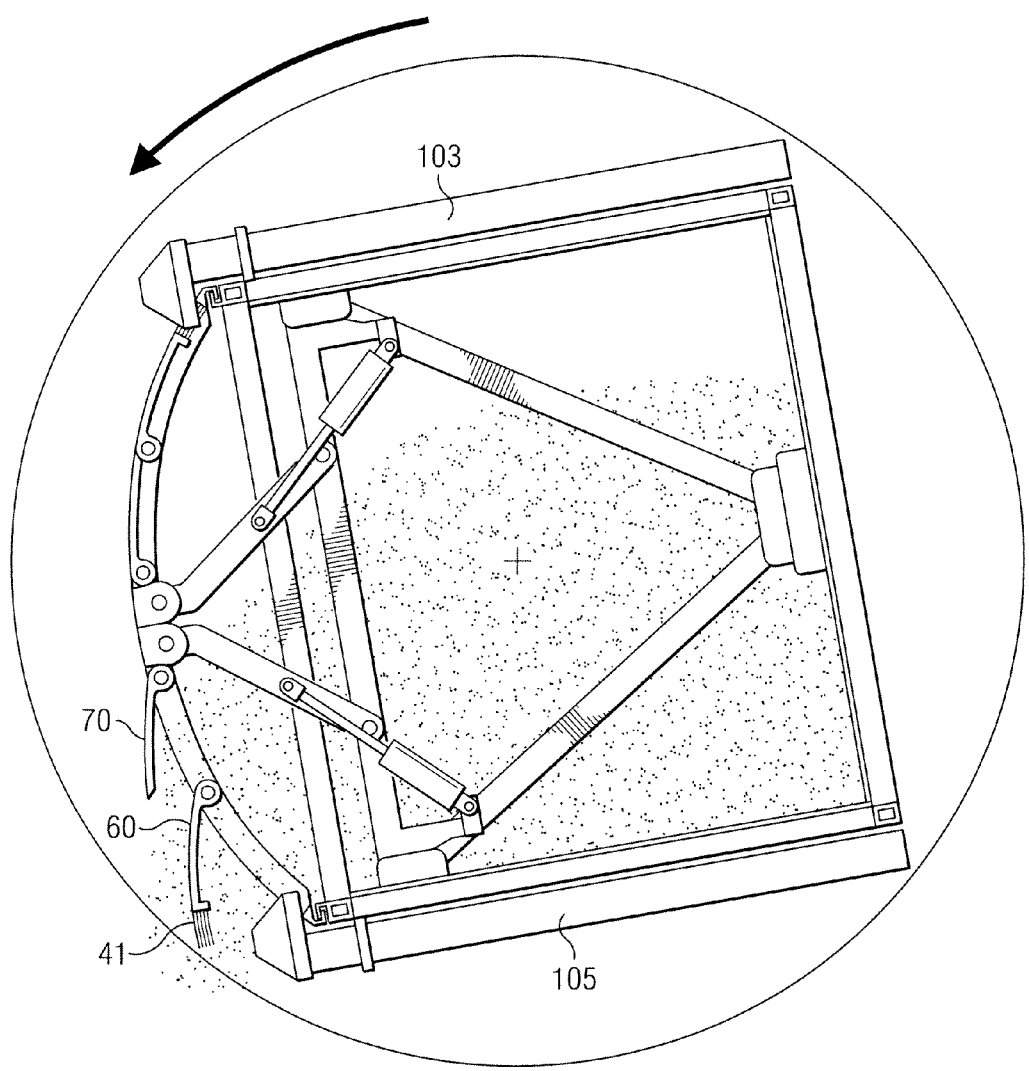
Figure 4E:
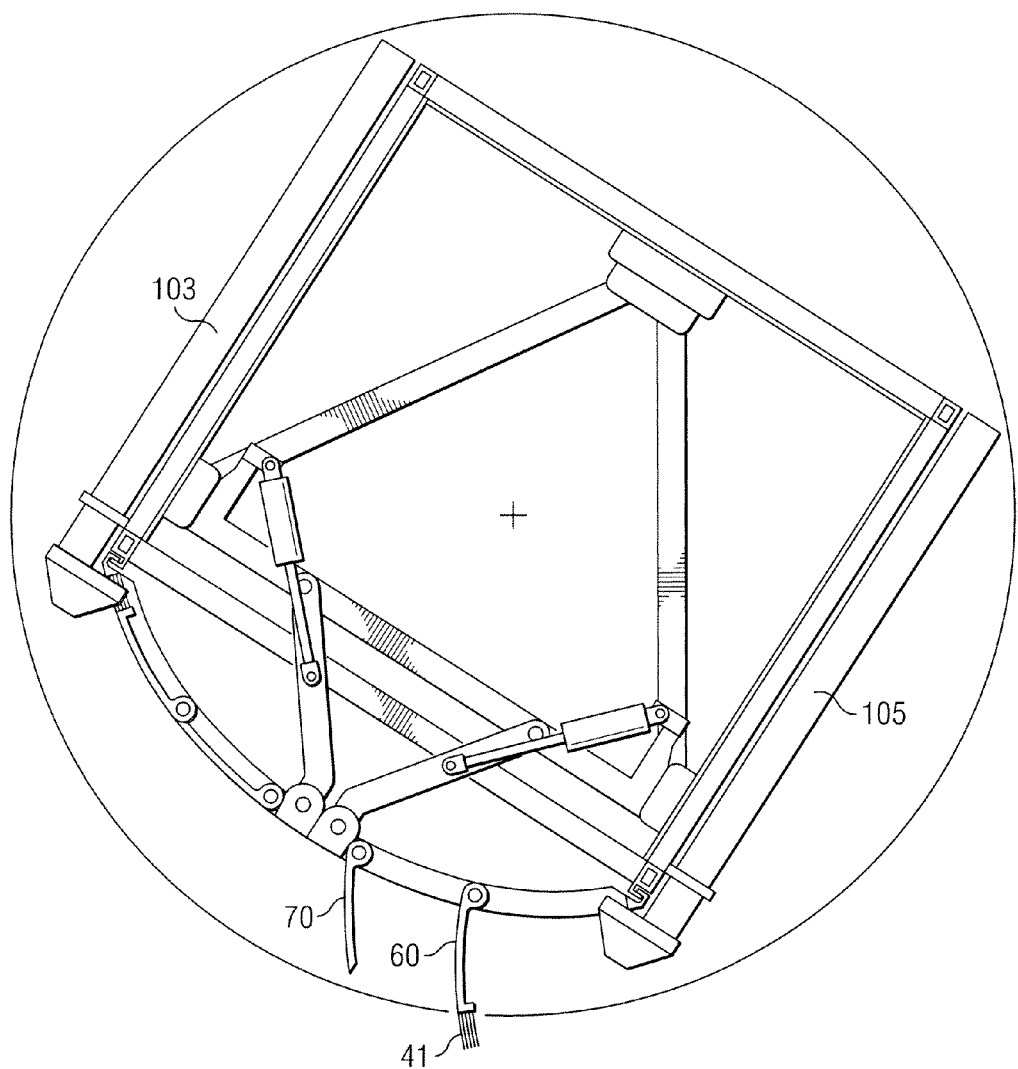

As will be appreciated from FIGS. 1 and 2, the discharge doors (such as door 60 in FIG. 2) are held in a closed position at least partly by the force of gravity when the respective A-frame section is in the closed position, but moves under its own weight about its respective hinged longitudinal axis to open during a rotary dumping operation (see FIGS. 4D and 4E). The discharge doors can be spring-biased to an initially closed position, if desired. Rotary dumping of the rail car and the discharge of porous material, along the force of gravity, causes the discharge doors to open.

Again with reference to FIG. 1, the A-frame sections in the closed position present an arcuate overall profile as viewed from the shorter end walls of the rail car. The intermediate edges of selected A-frame sections (such as edges 62, 64 in FIG. 1) at an end of each rail car can be provided with arcuate end members 66, 68 located thereon. The arcuate end members 66, 68 close off what would be an open area at the end of each car. The end members 62, 64, along with the A-frame sections (such as section 37) together define an end closure which helps to prevent porous material from being spilled while traveling and also reduces aerodynamic drag during transport operations.

Figure 3:
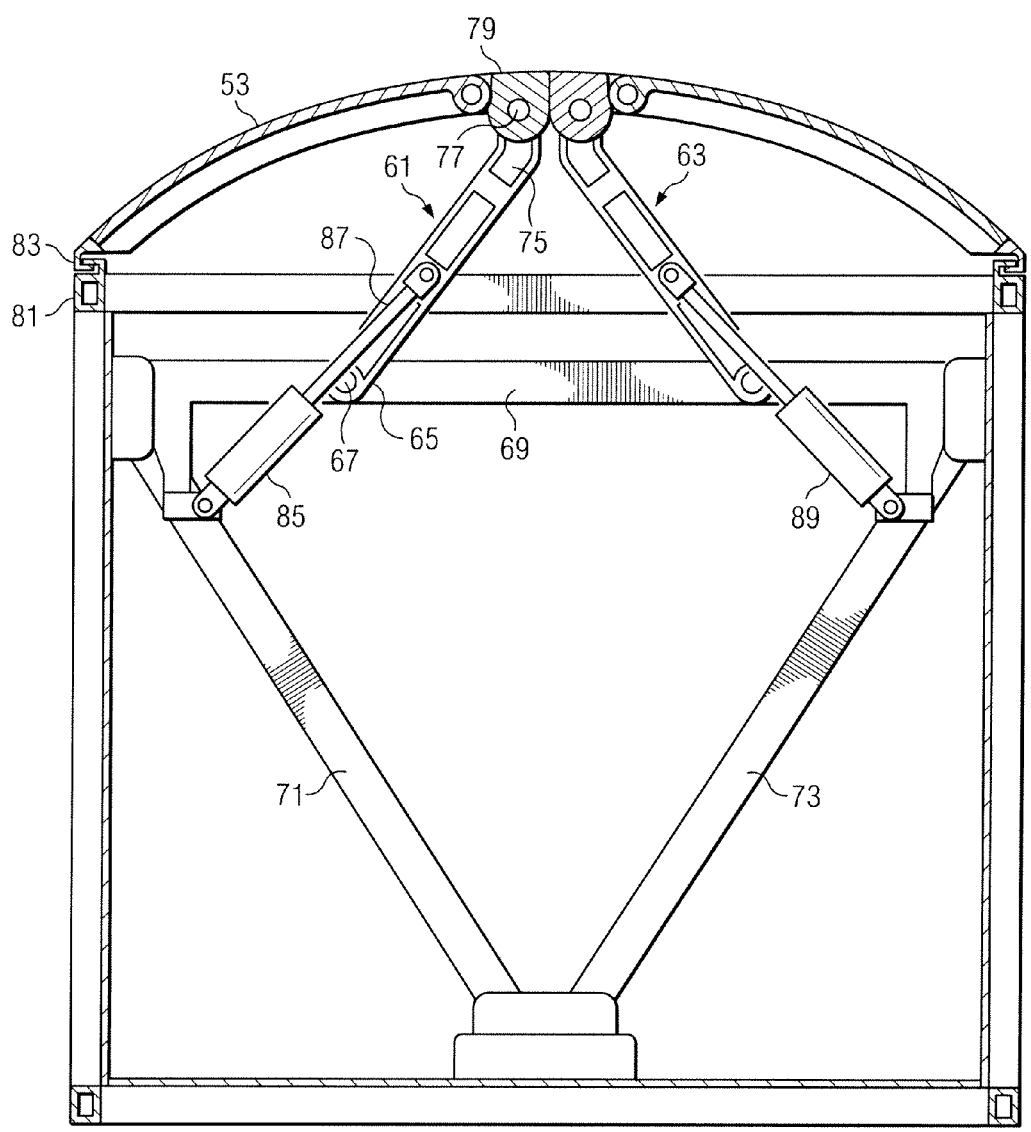
FIG. 3 is view similar to FIG. 2, but taken along lines 3-3 in FIG. 2.

The "hockey stick" pivot-linkage mechanism which is used to slide the A-frame sections over the respective sides of the rail car will now be described in greater detail. Turning to FIG. 3, it will be appreciated that the pivot-linkage mechanism associated with each A-frame section includes a pivot link 61, 63. Each pivot link, such as link 61, has an inner pivot end 65. In the example shown, the inner pivot end 65 is mounted on a structural member within the rail car open interior. In the example illustrated, the pivot link inner end 65 is pivotally attached at a pivot point 67 to the horizontal structural beam 69 which together with beams 71, 73 form a part of the interior structural members of the rail car. The pivot link 61 also has a second, outer pivot end 75 which extends outwardly from the rail car open interior and which is attached at a pivot point 77 located along the second longitudinal edge 79 of the associated A-frame.

When viewed from the end of the car, the apparatus presents a hockey stick appearance with the A-frame section corresponding to the hockey stick head and the pivot-linkage mechanism corresponding to the hockey stick shaft. The hockey stick also presents a type of knife edge linkage in use, helping the cover to move back and forth across the coal contained in the upper region of the car interior when the car is fully loaded.

It will be appreciated that movement of the pivot link 61 in an arcuate path of travel about the pivot axis 67 allows its associated A-frame section to slide over a respective longitudinal edge (81 in FIG. 3) of the rail car as the A-frame section moves from the closed position to an open position. In the fully open position, the respective A-frame section covers a portion of a respective opposing long sidewall of the rail car. The A-frame sections are shown moved to the open position in FIG. 4B of the drawings. The "hockey stick" nature of the pivot-linkage mechanism and associated A-frame section allows the cover to be moved off the top of the car and into a position which is out of the way of existing tipples for loading or other location equipment at the mine loading site.

Note also from FIG. 3 that the discharge doors, such as door 53 has an outer lip 83 which is received within a channel on the side panel of the rail car in the closed position, but which moves out of engagement with the channel as the A-frame section is moved to the open position. The outer lip 83 and channel help to ensure that the discharge doors 53 will remain shut as the rail car moves during transport operations.

When the A-frame section is moved to the open position shown in FIG. 4B, it may be biased toward the sidewall of the rail car, as by a spring located between the A-frame section and a convenient location on the rail car.

Each of the pivot links can be moved in the arcuate path described by any convenient power source, for example a commercially available hydraulic or pneumatic fluid power source. In the version of the device illustrated in FIG. 3, the power source is a fluid cylinder 85 having an output shaft 87. The output shaft 87 is operatively associated with the pivot link 61 so that as the output shaft 87 is retracted in FIG. 3, the pivot link 61 moves in an arcuate path to the left, causing the A-frame member to be moved to the left, whereby it slides over the edge of the rail car. The pivot link 63 and associated fluid cylinder 89 work in identical, mirror image fashion.

It will also be appreciated that the power source can be actuated in any convenient fashion. Hydraulic or pneumatic power may be supplied from a convenient storage source upon the throwing of a switch. The switch could be as simple as a remote push button on a key fob or the like to enable an operator to open and close the A-frame sections at any location.

The method of loading and unloading a rail car using the apparatus of the invention will now be described with reference to FIGS. 4A-4E. In the view shown in FIG. 4A, the two A-frame sections 37, 39 are in the closed position, transport position. One could assume, for example, that the car is arriving at the mine location empty in condition to be loaded with coal. The fluid cylinders 91, 93 each have their respective outputs shafts 95, 97 fully extended. The discharge doors, such as doors 60, 70 in FIG. 4A, are in the closed position.

With reference now to FIG. 4B, the A-frame sections have been opened by retracting the output shafts of the fluid cylinders 91, 93. As will be apparent from FIG. 4B, the A-frame sections "slide" over the top longitudinal edge 81 of the rail car. The open interior of the rail car can then be filled with porous particulate material, such as the coal 99. In the example, a conventional "coal tipple" 101, already present at the mine location, is used to fill the car interior.

FIG. 4C is a partly schematic representation of the rail car having its top cover returned to the closed position shown in FIG. 4A with the car inside a conventional rotary dumping apparatus. These types of devices, which have been described briefly, are conventional in the industry and do not form a part of the present invention. The dumping apparatus includes a plurality of engagement members, such as members 103, 105, each of which has clamp element (such as elements 107, 109 in FIG. 4C) for securely engaging the rail car within the rotary dumping assembly. Note that the space created by the brushes 41 allows the clamp elements 109 adequate room to securely grip the side of the rail car.

The rotary dumping assembly is illustrated schematically in FIG. 4C by the circle 111 drawn around the secured rail car. As shown in FIGS. 4D and 4E, the rotary dumping assembly rotates the rail car about as axis of rotation of approximately 140 to 160°. Rotation of the rail car in the rotary dumping assembly also serves to cause the discharge doors 60, 70 to open, allowing the coal to be discharged from the interior of the car. Movement of the discharge doors 60, 70 can be by force of gravity and the weight of the coal alone.

FIG. 4E shows the rail car inverted in the rotary dumping apparatus with the discharge doors 60, 70 fully open and the car contents fully discharged. The dumping cycle is then essentially reversed so that the rail car is rotated in the opposite direction, returning the car to the position shown in FIG. 4A. The car is now ready for transport back to the mine location to again be filled.

While the apparatus of the invention has been described with respect to a rotary dumping operation, it will be appreciated that it can be used with bottom dump cars, or "combo-cars", as well. While the previously described pivot-linkage mechanism is not utilized in the bottom dump operation, the cover still acts to prevent particulate emissions and to improve fuel economy during transport. In the case of rotary dumping of the rail car, however, the act of discharging the coal or other porous material, along with the force of gravity, causes the discharge doors move to the open position. In this sense, the doors are automatic in operation (free swinging). As a result of the automatic operation of the discharge doors, the rotary unloading process is not slowed in any way. The doors self-close as the car returns to the upright position during the rotary dumping operation. It is then ready to return to the mine for reloading.

An invention has been provided with several advantages. The cover of the invention is "universal" in nature in that it can be used with all three common types of open top rail cars in use at the present time. The improved cover of the invention protects coal or other porous material during transport by rail so that dust emissions and pollution from coal dust are reduced. The covers also reduce aerodynamic drag and improve the fuel efficiency of the associated locomotive rail engine both due to the reduction in wind drag, and also due to the fact that no snow or rain has entered the car interior. Standard, existing equipment can be used to load the rail car. The covers are relatively simple in design and economical to manufacture. They can be manufactured from a variety of readily available existing materials. No drastic modification to the body of the basic rail car design will be required. Repairs and operations are manageable by the standard rail car repair shop with existing equipment and materials and manpower training skills.

While the invention has been shown in only one of its forms, it is not thus limited but is susceptible to various changes and modifications without departing from the spirit thereof.

What is claimed is:

1. An improved rail car pulled by an engine for transporting coal or other porous dust bearing materials having opposing long sidewalls and opposing shorter end walls, which together define an initially open interior, a bottom and an open top and an improved cover for the open top, the improved cover comprising:
   at least one pair of opposing A-frame sections mounted over the open top of the rail car to form an A-frame unit, each of the A-frame sections having a first, longitudinal edge generally aligned with one of the opposing long sidewalls of the car in a closed position, the A-frame section also having a second, longitudinal edge spaced apart from the first longitudinal edge and opposing intermediate edges which together form a discharge door opening for each of the A-frame sections;
   at least one discharge door located in the discharge door opening of each A-frame section, the discharge door being pivotally hinged along a longitudinal axis which is generally parallel to the first and second longitudinal edges of the respective associated A-frame section;
   a pivot-linkage mechanism associated with each of the respective A-frame sections for moving each A-frame section from the closed position to an open, loading position to allow coal or other porous dust bearing material to be loaded into the open interior of the car;
   and wherein moving the A-frame sections from the open, loading position to the closed position protects the coal from air flow while in motion and improves fuel economy of the engine by the reduction of aerodynamic drag, the discharge doors allowing the coal or other porous material to be dumped in a rotary dumping operation.

2. The improved rail car of claim 1, wherein the discharge door is held in a closed position at least partly by the force of gravity when the respective A-frame section is in the closed position, but moves under the discharge door's own weight about the hinged longitudinal axis to open during a rotary dumping operation.

3. The improved rail car of claim 2, wherein a plurality of A-frame units are provided, at least one of the plurality of A-frame units having at least one discharge door located in an opening formed in the A-frame units, the discharge doors being spring-biased to an initially closed position.

4. The improved rail car of claim 3, whereby rotary dumping of the rail car and the discharge of porous material, by the force of gravity, causes the discharge doors to open.

5. The improved rail car of claim 4, wherein the intermediate edges of selected A-frame sections at an end of each rail car have arcuate end members located thereon, whereby the end members, along with the A-frame sections together define an end closure which helps to reduce porous material from being spilled while traveling and also reduces aerodynamic drag during transport operations.

6. The improved rail car of claim 1, wherein each rail car cover has at least three A-frame units carried thereon.

7. The improved rail car of claim 1, wherein the pivot-linkage mechanism associated with each A-frame section includes a pivot link having an inner pivot end mounted on a structural member within the rail car open interior, the pivot link having a second, outer pivot end which extends outwardly from the rail car open interior and which is attached at a pivot point located along the second longitudinal edge of the associated A-frame, whereby movement of the pivot link in an arcuate path of travel allows its associated A-frame section to slide over a respective longitudinal edge of the rail car as the A-frame section moves from the closed position to an open position covering a portion of a respective opposing long sidewall of the rail car.

8. The improved rail car of claim 7, wherein the pivot link is moved in the arcuate path by means of a fluid cylinder having an output shaft which is associated with the pivot link.

9. The improved rail car of claim 1, wherein at least one of the discharge door openings are at least partly covered with brushes which allow operative components of a rotary dumping apparatus to engage the rail car in a rotary dumping apparatus and which increase air flow into the rail car interior during a bottom dumping operation.

10. A method for loading and unloading an open top rail car pulled by an engine for transporting coal or other porous dust bearing materials, where the rail car has opposing long sidewalls and opposing shorter end walls, which together define an initially open interior, a bottom and an open top, the method comprising the steps of:
   transporting a plurality of the open top rail cars to a loading location;
   providing at least one pair of opposing A-frame sections mounted over the open top of each of the rail cars which together define an A-frame unit, each of the A-frame sections having a first, longitudinal edge generally aligned with one of the opposing long sidewalls of the car in a closed position, the A-frame section also having a second, longitudinal edge spaced apart from the first longitudinal edge and opposing intermediate edges which together form a discharge door opening for each of the A-frame sections;
   locating at least one discharge door in the discharge door opening of each A-frame section, the discharge door being mounted by a pivotal hinge along a longitudinal axis which is generally parallel to the first and second longitudinal edges of the respective associated A-frame section;
   providing a pivot-linkage mechanism associated with each of the respective A-frame sections for moving each A-frame section from the closed position to an open, loading position to allow coal or other porous dust bearing material to be loaded into the open interior of each of the cars;
   actuating the pivot-linkage move the A-frame sections to the open position and subsequently loading the rail cars;
   and thereafter moving the A-frame sections from the open, loading position to the closed position to protect the loaded coal from air flow while in motion and to improve fuel economy of the engine by the reduction of aerodynamic drag.

11. The method of claim 10, wherein the discharge doors are held in a closed position at least partly by the force of gravity when the respective A-frame section is in the closed position, but move under the discharge door's own weight about a respective hinged longitudinal axis to open during a rotary dumping operation.

12. The method of claim 11, wherein a plurality of A-frame units are provided, at least one of the plurality of A-frame units having at least one discharge door located in an opening formed in the A-frame sections, the discharge doors being spring-biased to an initially closed position.

13. The method of claim 12, wherein the pivot-linkage mechanism associated with each A-frame section includes a pivot link having an inner pivot end mounted on a structural member within the rail car open interior, the pivot link having a second, outer pivot end which extends outwardly from the rail car open interior and which is attached at a pivot point located along the second longitudinal edge of the A-frame, whereby movement of the pivot link in an arcuate path of travel allows its associated A-frame section to slide over a respective longitudinal edge of the rail car as the A-frame section moves from the closed, transport position to an open, loading position covering a portion of a respective opposing long sidewall of the rail car.

14. The method of claim 13, wherein the pivot link is moved in the arcuate path by means of a fluid cylinder having an output shaft which is associated with the pivot link.

15. The method of claim 14, further comprising the steps of:
actuating a respective fluid cylinder to move its associated A-frame section to the open position and loading coal into the rail car open interior;
thereafter, again actuating the fluid cylinder to move the A-frame section to the closed, transport position;
transporting the closed rail car from a mine location to a power plant location.

16. The method of claim 15, further comprising the steps of:
moving the rail car into position within a rotary dumping apparatus;
using the dumping apparatus to rotate the rail car in an arcuate path of about 140 to 160 degrees of travel to a position in which the open interior of the car is oriented at least partly upside down;
whereby the discharge doors swing open by the influence gravity and of the porous material contained in the rail car interior to thereby dump the porous material.

17. The method of claim 16, wherein at least one of the discharge door openings are at least partly covered with brushes which allow the rail car to be received in a rotary dumping apparatus.

* * * * *